O. G. SIMMONS.
PRESSED METAL WHEEL.
APPLICATION FILED APR. 3, 1916.
1,282,305.
Patented Oct. 22, 1918.
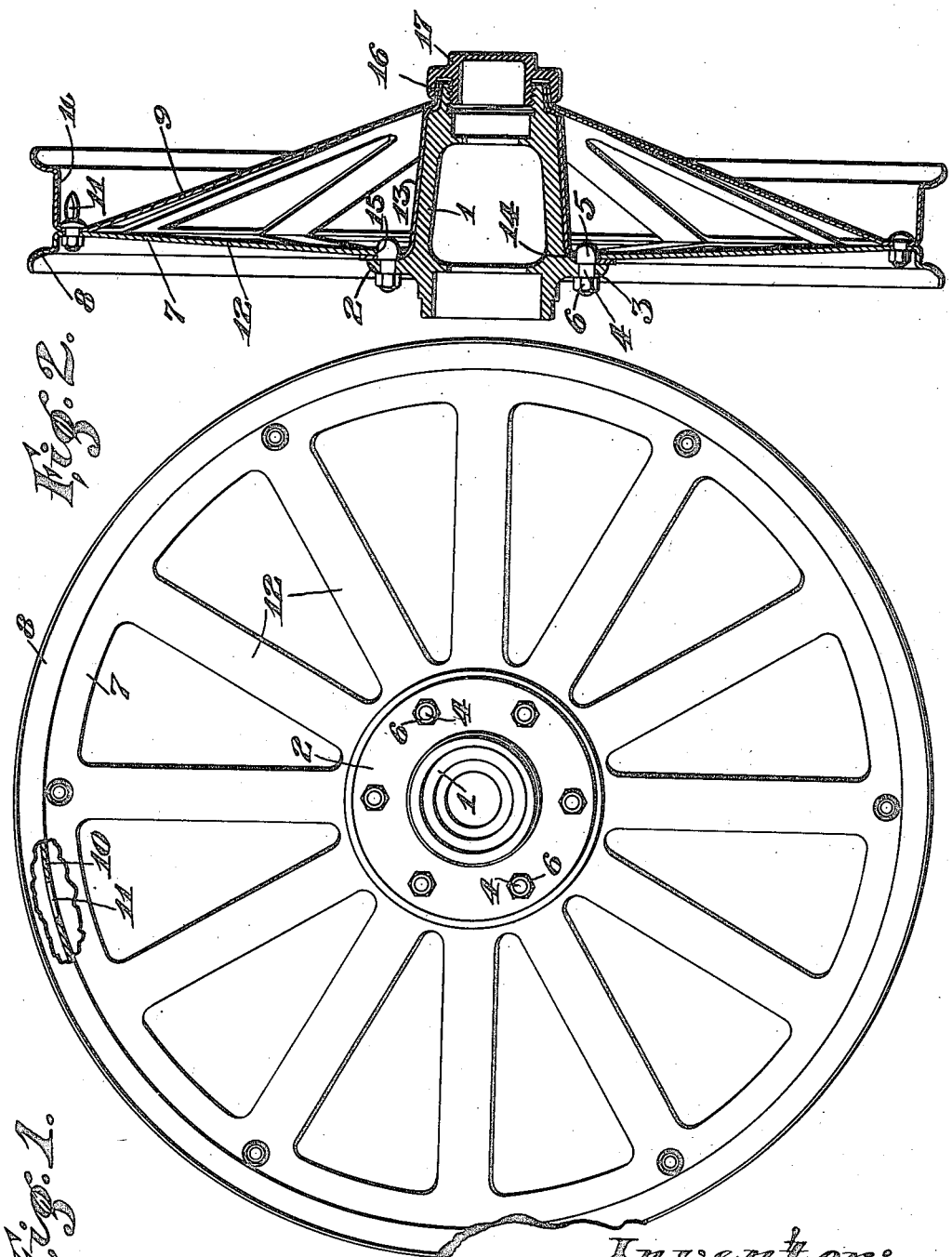

UNITED STATES PATENT OFFICE.

OLIVER G. SIMMONS, OF SAN ANTONIO, TEXAS, ASSIGNOR TO SIMMONS WHEEL COMPANY, OF SAN ANTONIO, TEXAS, A CORPORATION OF TEXAS.

PRESSED-METAL WHEEL.

1,282,305.

Specification of Letters Patent.

Patented Oct. 22, 1918.

Application filed April 3, 1916. Serial No. 88,437.

*To all whom it may concern:*

Be it known that I, OLIVER G. SIMMONS, a citizen of the United States, residing in San Antonio, in the county of Bexar and State of Texas, have invented new and useful Improvements in Pressed-Metal Wheels, of which the following is a specification.

This invention relates to pressed metal wheels of the type shown and described in my Patent No. 1,179,768 on demountable wheel, granted April 18, 1916, and has special reference to a means for non-rotatably mounting the wheel proper upon the hub. In my prior construction the hub is non-circular in cross section, and the hub member of the inner wheel section is correspondingly shaped so that when mounted upon the hub it will turn therewith. It may, however, often be found desirable to use a hub which is circular in cross section and I have devised the arrangement embodied in the present application for use with my improved construction of wheel. One of the objects of the present invention, therefore, is to provide means for positively locking the wheel proper to the hub other than by the use of a hub and hub member of non-circular formation. A further object of the invention is to provide one of the integral rim sections of greater width than the other so that I am enabled to form the web of the inner wheel section more nearly vertical and by which I am also enabled to place the opening for the tire valve wholly in one of the rim sections.

The invention is illustrated in the accompanying drawing in which—

Figure 1 is a view in broken side elevation of a wheel constructed according to my invention looking at the inner side thereof, and Fig. 2 is a vertical sectional view of the same.

Referring now to the drawing, the numeral 1 indicates the hub of the wheel, which toward its inner end is provided with an annular shoulder 2 provided with a series of equally spaced apertures 3 for receiving bolts 4 having on their outer ends heads 5 and screw-threaded on their inner ends to receive nuts 6. The numeral 7 indicates the inner wheel section, which is provided with an integral rim section 8. The numeral 9 indicates the outer wheel section which is provided with an integral rim section 10. As will be seen, the rim section 10 is much wider than the rim section 8, its seat portion being of such width that an aperture 11 for the air valve may be made therein. This construction, moreover, enables me to direct the web portion or spokes 12 of the inner wheel section nearly at a right angle to the longitudinal axis of the wheel, and to greatly incline the web section or spokes of the outer wheel section 9. The inner wheel section 7 has a hub member 13 which may be integral therewith, or separate and welded thereto, as contemplated in the present case. In either event I form a double thickness of metal adjacent this point, and make the hub member rigid with the inner wheel section. The bend made in the wheel section where the hub member joins it forms a shoulder 14 which abuts against the annular shoulder 2 of the hub, and a double thickness of metal may be produced by forming a flange 13ᵃ on the hub member to form an overlap at the inner edges of the inner wheel section. In this overlap, and surrounding this shoulder I provide a circular series of apertures 15 for receiving the heads 5 of the bolts 4. When the hub member 13 is inserted over the hub 1, the apertures 15 pass over the heads 5 and thus the hub member is prevented from rotating independently of the hub. The hub ends of the wheel sections 7 and 9 are located at the outer side of the wheel, as indicated at 16, and are secured on the outer end of the hub by means of a nut 17, as in my prior construction. When the nut 17 is unscrewed the wheel body can be readily pulled off of the hub, as the openings 15 are not restrained from sliding over the heads 5. In putting the wheel body on the hub the openings 15 as readily slip over said heads.

I claim:

1. A pressed metal wheel comprising an inner wheel section and an outer wheel section of pressed sheet metal, detachably connected together at the rim of the wheel, a hub-member of sheet metal detachably connected at its outer end to the outer wheel section, and having a flange at its inner end abutting said inner wheel section and secured thereto to form an overlap of a double thickness of metal, said overlap having a plurality of openings formed therethrough, and a hub within said hub-member having a plurality of projections to engage in said openings, the wheel, as a whole, being bodily removable from said hub, and the wheel sections being readily separable from each other.

2. A pressed metal wheel comprising two unitary peripherally-converging parts constituting opposite side members of the wheel, each part consisting of a rim section forming a part of a tire seat, a hub member and a connecting web section, the web of the outer member of the wheel being inclined at a greater angle than that of the inner member, and having a wider rim section, the latter being provided with an opening for an air valve.

In testimony whereof, I have hereunto set my hand.

OLIVER G. SIMMONS.